United States Patent [19]
Treiber

[11] Patent Number: 6,000,319
[45] Date of Patent: Dec. 14, 1999

[54] APPARATUS AND METHOD FOR COOKING AND SMOKING FOOD

[75] Inventor: Rodney L. Treiber, Estes Park, Colo.

[73] Assignee: Hightemp LLP, Estes Park, Colo.

[21] Appl. No.: 09/098,574

[22] Filed: Jun. 17, 1998

Related U.S. Application Data

[63] Continuation-in-part of application No. 08/726,838, Oct. 8, 1996, Pat. No. 5,768,983.

[51] Int. Cl.⁶ .............................. A47J 37/07; A47J 37/04
[52] U.S. Cl. .................................. 99/449; 99/450; 99/482; 126/275 R; 426/314
[58] Field of Search ............................. 99/482, 450, 473, 99/415, 449; 126/275 R, 9 R; 426/314, 315

[56] References Cited

U.S. PATENT DOCUMENTS

| | | | |
|---|---|---|---|
| 534,906 | 2/1895 | McLean | 126/275 R |
| 1,723,413 | 8/1929 | Drehmann | 126/275 R |
| 3,078,783 | 2/1963 | Lee, Sr. | 99/482 X |
| 4,810,510 | 3/1989 | Lever et al. | 99/482 X |
| 5,280,749 | 1/1994 | Smit | 99/422 |

*Primary Examiner*—Reginald L. Alexander
*Attorney, Agent, or Firm*—Ancel W. Lewis, Jr.

[57] ABSTRACT

An apparatus and method of cooking and smoking food is disclosed. The apparatus has an outer container, an inner container, and a cover for the inner container. The outer container is provided with a bottom wall which receives a smoke material such as wood chips, herbs and the like thereon and the inner container is provided with a bottom wall with smoke flow apertures therein wherein food is placed on the bottom wall of the inner container, the bottom wall of the inner container being spaced from the bottom wall of the outer container. The smoke material is ignited to provide smoke which flows up through the apertures in the bottom wall of the inner container and along with the heat being generated by the bottom wall of the outer container and the ignited material provides the smoke and cooking heat for the food. One embodiment has cylindrical telescoping containers and another pan shaped nesting container. One method disclosed involves high temperatures and fast cooking while another method disclosed involves low temperatures and slow cooking.

16 Claims, 6 Drawing Sheets

APPARATUS AND METHOD FOR COOKING AND SMOKING FOOD

This application is a continuation-in-part of application Ser. No. 08/726,838 filed Oct. 8, 1996 now U.S. Pat. No. 5,768,983.

TECHNICAL FIELD

The present invention relates to a smoking and cooking apparatus and method and more particularly to an apparatus and method for cooking and smoking portions of meats, seafood, poultry and other food products wherein meats, seafood and poultry can be cooked and smoked both in a relatively short period of time or slowly over a relatively long period of time.

BACKGROUND ART

Meats, seafood and poultry having the taste of smoked wood, such as hickory and mesquite and other sources for flavoring, have acquired wide acceptance in our society. In many instances, the cooking and smoking of these products using wood chips as the source for the heat and smoke take many hours in preparation. Moreover, in restaurants, and particularly fast food restaurants, when cooked foods with a smoke taste are prepared the food products are generally marinated or grilled with a liquid smoke as opposed to actual/smoking the food product. In restaurants, and particularly those of the fast food variety, a wood cooker-smoker which prepares a smoked food product in a very short period of time would increase efficiency and provide more authenticity to the prepared food over those using liquid smoke in the food preparation process.

DISCLOSURE OF THE INVENTION

It is a principal object of the present invention to provide an apparatus and method for smoke cooking portions of meats, seafood, poultry, and other food products.

It is another object of the present invention to provide an apparatus and method wherein wide varieties of foods can be smoked and cooked quickly in time constraints demanded in commercial eating establishments.

It is even a further object of the present invention to provide an apparatus for smoking and cooking which is relatively inexpensive and easily assembled.

More particularly, the present invention in a first embodiment disclosed provides an apparatus and method for cooking and smoking comprising an outer container having a closed bottom and an open top; an inner container having an outer diameter less than the inner diameter of said outer container, said inner container having a bottom with smoke flow apertures therein and an open top, the inner container being received within the outer container and in contact with the outer container so that upon heating the outer container heat is conducted and radiated to the inner container to smoke and cook the food; means are provided to space the inner container bottom above the outer container bottom; and, cover means for the open top of said inner container.

A second embodiment disclosed has a pan shaped outer container in which there nests a pan shaped inner container. The inner container has surfaces in contact with surfaces of the outer container for conducting and radiating heat from the outer container to the inner container. In the high temperature method preferably the heat is initially applied to both containers and the cover. A smoke material is placed in the outer container and the top of the inner container is covered. The inner container is placed in the outer container and heat is applied to the outer container so that smoke passes from the outer container through the smoke flow apertures and to the food to smoke and cook the food. The temperature range is between about 300° F. to 1000° F. for a time of about one to five minutes. In the slow cooking and smoking method the outer container is heated, smoke material is placed in the outer container, the heat is removed from the outer container, the food is placed in the inner container, the cover is placed on the outer a container and the outer container is then heated so as to conduct and radiate heat into the inner container to smoke and cook the food. The temperature range preferably is between about 1° F. to 300° F. for a time of about five minutes to sixty minutes.

Accordingly, other objects and advantages of the present invention will be apparent by reference to the following description of preferred embodiments, drawings and appended claims.

BRIEF DESCRIPTION OF THE DRAWINGS

Details of this invention are described in connection with the accompanying drawings that bear similar reference numerals in which.

DETAILED DESCRIPTION OF THE INVENTION

Figure 1:
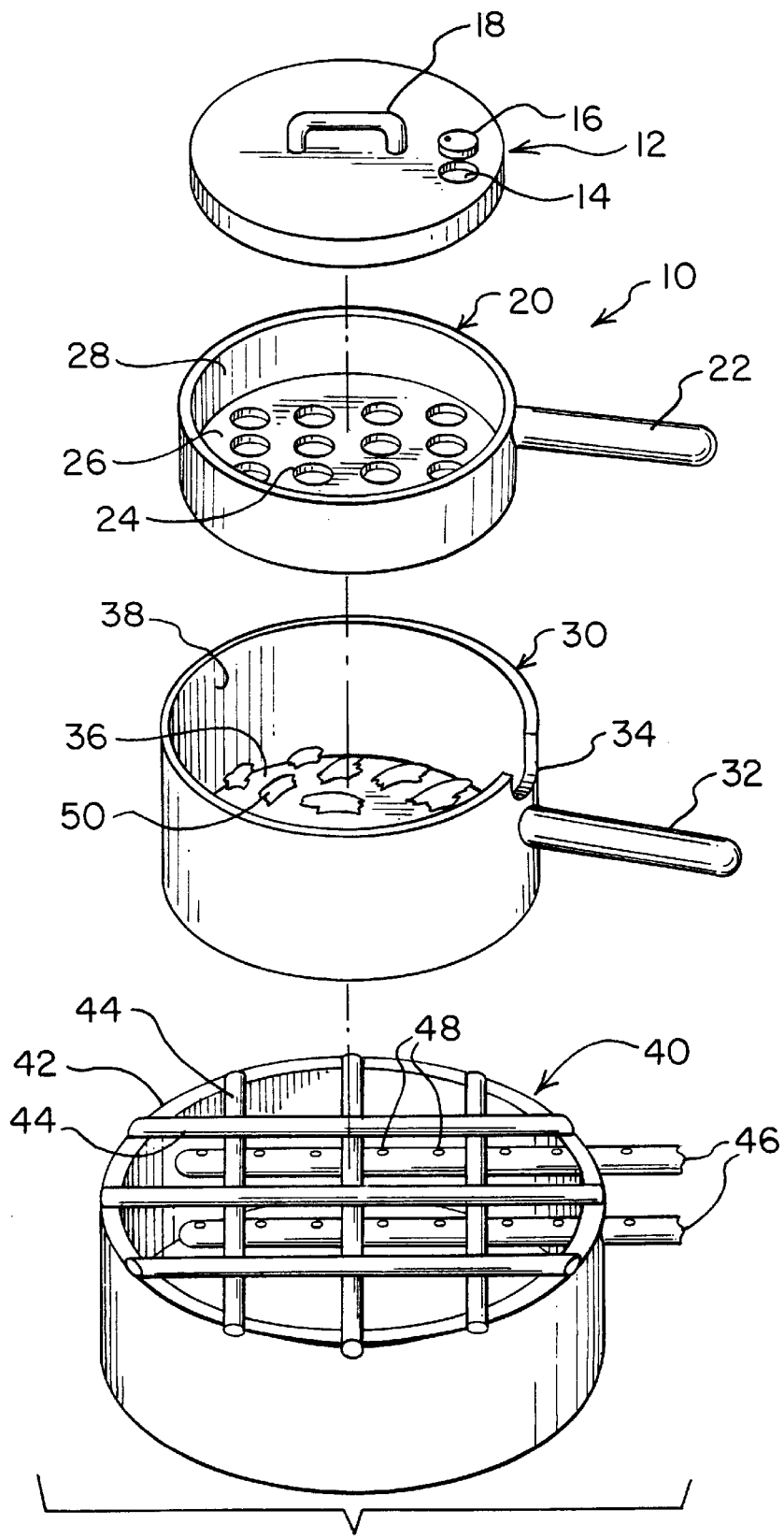
FIG. 1 is an exploded perspective view of one preferred embodiment of the present invention.

Turning now to the drawings, as best shown in FIG. 1, a smoke cooker assembly 10 of the present invention includes a cover 12, inner cooking container 20 and an outer cooking container 30 which receives the inner cooking container 20 therein. The cover 12, which is for the inner cooking container 20, is generally of cast iron but may be aluminum or the like and is generally provided with an air flow vent 14 with an air flow vent cover 16 which is pivotally attached to the top of the cover 12 thereby allowing for selective closing of the vent 14 when in use. A handle 18 is also provided for easy removal of the cover 12 from the inner cooking container 20.

The inner cooking container 20 which is also generally of cast iron but may be of aluminum or the like is provided with a bottom 26 having a plurality of openings 24 therein, the openings 24 being flow-through openings to receive the smoke evolving from the smoking of the wood chips 50 in the outer container 30. The bottom 26 is also provided to receive food products, such as meats, seafood, poultry and the like thereon. And, the inner cooking container 20 is provided with a circumferentially extending sidewall 28.

The outer cooking container 30 includes a bottom 36 and a circumferentially extending sidewall 38. The bottom 36 is provided to receive wood chips 50 and the like thereon which provides the smoke for smoking the meats and the foods to be cooked and smoked in the inner cooking container 20. The wood chips 50 that are provided for the smoker have usually been water soaked overnight or for a selected period of time so that when heat is added to the wood chips, the moisture within the wood chips, along with the ignition of the chips, provides the smoke and heat for the smoking and cooking of the food products. The outer cooking container 30 is generally made of cast iron but may also be aluminum or other materials used for smoking. Also, the outer cooking container 30 may include a handle 32 thereon for easy movement onto and away from a heat source, such as, grill 40.

Figure 2:
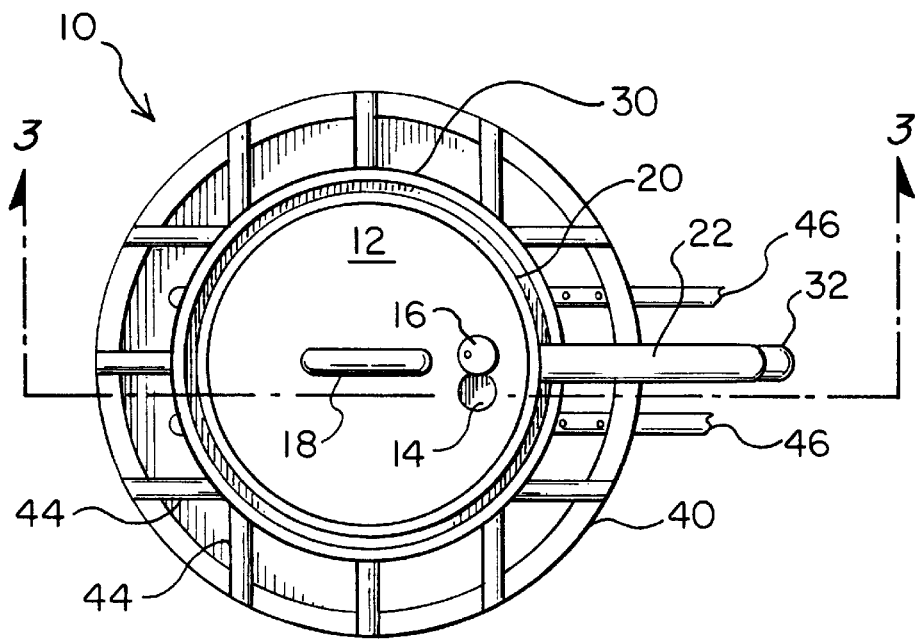
FIG. 2 is a top view of the preferred embodiment of FIG. 1 in combination with a cooking grill.

As best shown in FIGS. 2 and 3, the outer diameter of the sidewall 28 is less than the inner diameter of the circumferentially extending sidewall 38 of outer container 30 so that the inner cooking container 20 fits easily within the outer cooking container 30. Generally, there is very little space between the outer surface of the sidewall 28 and the inner surface of the sidewall 38. The spacing between these walls 28 and 38 is generally less than ¼" in thickness.

Figure 3A:
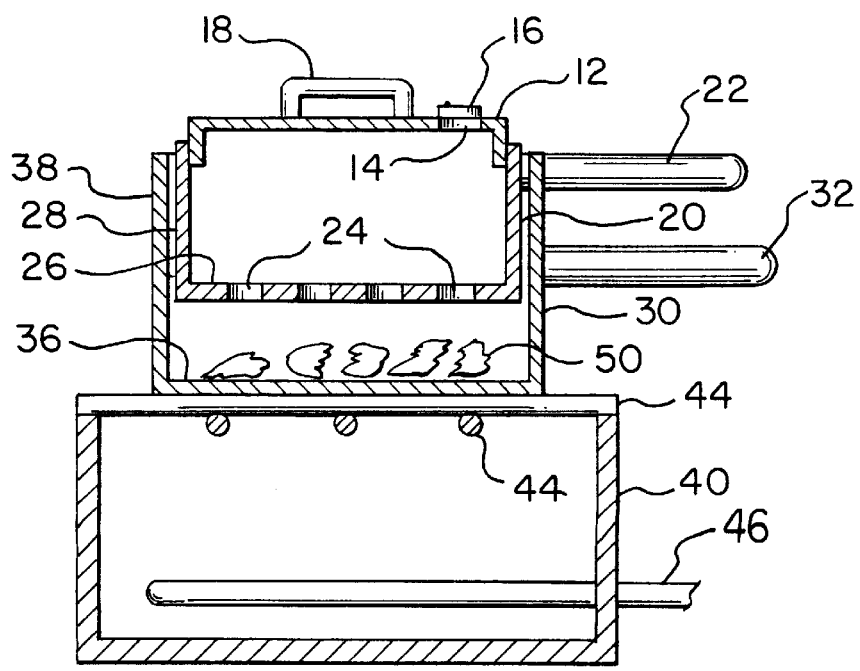
FIG. 3A is a sectional view taken along lines 3—3 of FIG. 2.

The inner cooking container 20 is also provided with a handle 22 for easy removal of the inner cooking container 20 from the outer cooking container 30. Also, the outer cooking container 30 is provided with a notch therein, generally of U-shaped configuration, as best shown in FIG. 1, to receive the handle 22. Moreover, the distance between the bottom portion of the handle 22 and the bottom wall 26 is less than the distance between the lower most portion of the notch 34 and the bottom wall 36 thereby providing for a spacing between the bottom wall 36 of the outer cooking container 30 and the bottom wall of the inner cooking container 20. The spacing between the bottom wall 26 and the bottom 36 is best shown in FIG. 3A.

Figure 3B:
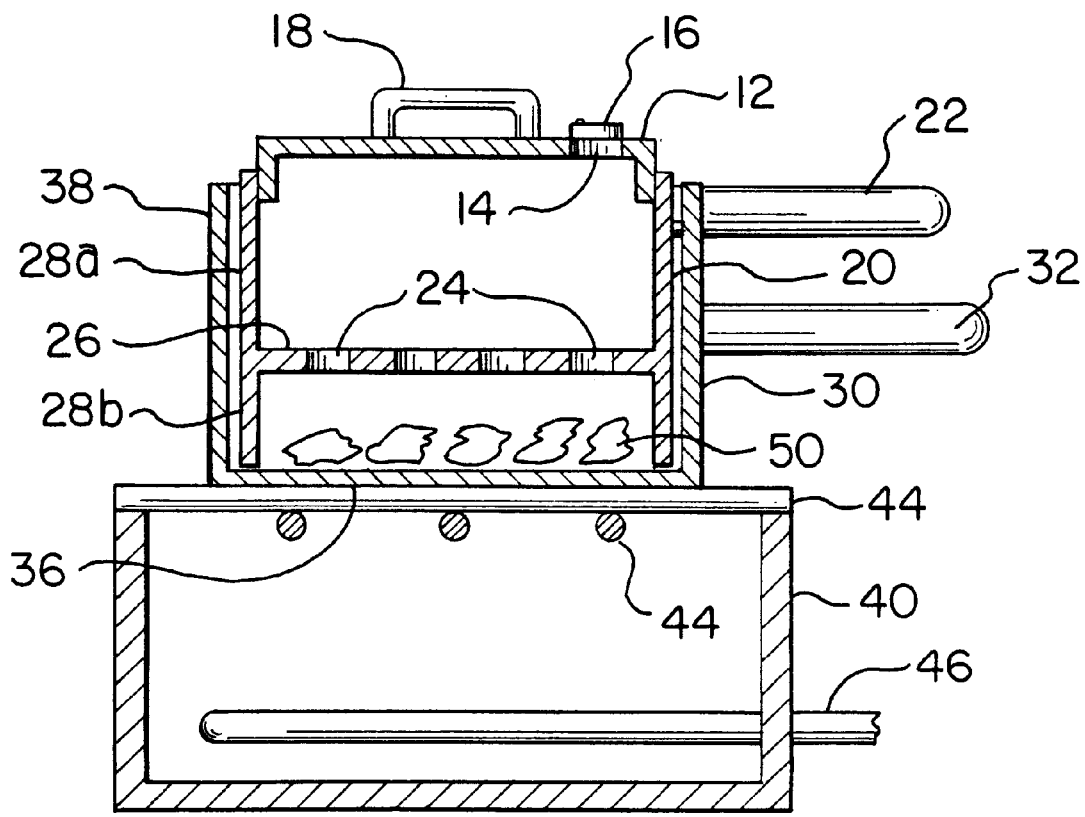
FIG. 3B is a sectional view of an alternative embodiment taken along the lines 3—3 of FIG. 2.

In an alternative embodiment, as shown in FIG. 3B, the container 20 is provided with a circumferential sidewall in two sections. The first or upper section of the sidewall is identified by the numeral 28a, this being the portion of the sidewall that extends above the bottom 26 and the lower portion of the circumferential sidewall is identified by the numeral 28b, this being the sidewall portion that extends below the bottom wall 26. The circumferential sidewall portion 28b is of preselected length and is received by the bottom wall 36 so that the bottom wall 26 is spaced from the bottom wall 36.

As best shown in FIG. 1, a gas grill 40 is provided to provide the heat to the wood smoker 10. A preferred gas grill 40 is provided with a top circumferentially edge 42 which receives a plurality of support rods 44 to provide a grilled framework for the receipt of the outer cooking container 30 thereon. The gas grill 40 is provided with a pair of parallel gas burner lines 46 wherein each gas burner line 46 includes a plurality of gas nozzles 48 therein which, upon ignition, provides the heat for the cooking.

In operation, and particularly in a commercial operation, soaked wood chips 50 are placed into the outer cooking container 30 which in turn is placed upon a grill 40. The grill 40 is preferably gas fueled but may be electric or the like and the temperature of the bottom 36 of the outer cooking container is brought up to a high temperature so that the wood chips are caused to ignite thereby providing the generation of smoke as well as providing heat to the bottom wall 26 for cooking the desired food products thereon. Meats, seafood, poultry or the like are then placed upon the bottom wall 26 of the inner cooking container 20 and with the bottom 36 having the wood chips 50 thereon already being at a relatively high temperature, such as 700° F. or the like, the pre-portioned foods placed on the bottom 26 are rapidly cooked and simultaneously smoked; and, with the rapid cooking and smoking retains their natural flavors and juices. Moreover, the cover 12 is placed over the inner cooking container 20 during the cooking process to keep the heat within the inner cooking container 20 thereby assisting in this rapid cooking and smoking of the pre-portioned foods.

It is realized that various flavors of wood chips 50 can be used, such as, for example, hickory, apple, mesquite and the like. Herbs and other seasonings may also be added in with the chips. Moreover, smoking and blackening of food products simultaneously may be accomplished with the high temperature smoker-cooker of the present invention.

Moreover, in commercial hotels, restaurants, and particularly in fast food establishments, the outer cooking container 30 may be left on the grill 40 for several hours at a time thereby maintaining heat to the bottom wall 36 so that the cooking surface is kept at the cooking temperature. In this case, since the bottom wall 36 is at a relatively high temperature, such as 700° F., then there is no delay in getting the cooking surface temperature up to a cooking temperature which in many instances requires several minutes before the surface is ready for cooking. Thus, the wood smoker-cooker, as described, is particularly useful in the kitchens of restaurants, bars and hotels which already are concentrating fast cooking of pre-portioned foods. And, the smokers can be provided in many different sizes without departing from the scope and spirit of the present invention.

Figure 4:
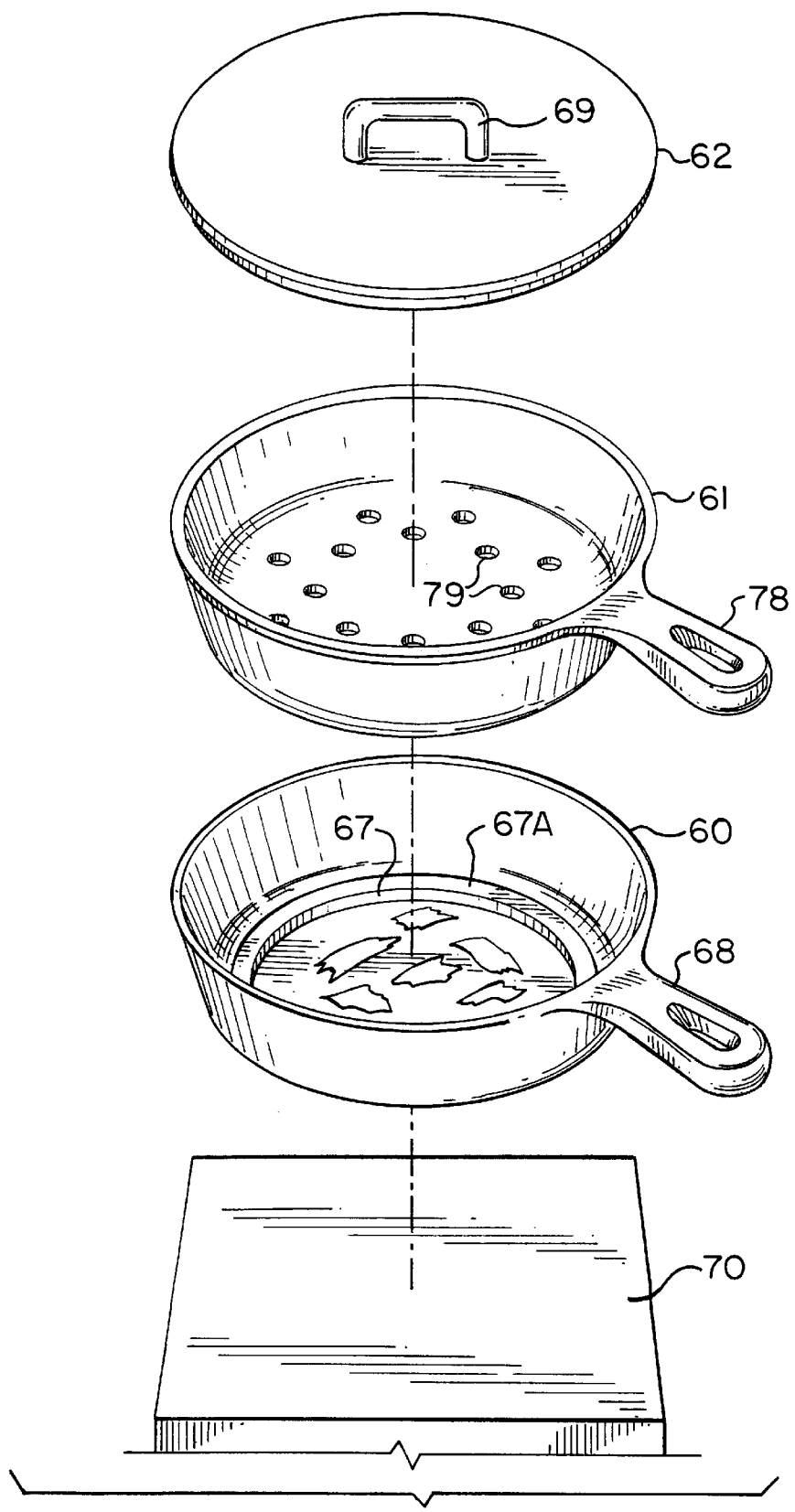
FIG. 4 is an exploded perspective view of another embodiment of a cooking and smoking apparatus embodying features of the present invention.

FIG. 4 shows another embodiment of the present invention including outer container 60, inner container 61 and cover 62 for the inner container. The outer container 60 is generally pan shaped having a flat outer bottom wall 63 and an outer sidewall 64 extending upwardly and outwardly from the periphery of outer bottom wall 63. Bottom wall 63 has a lower face 65 and an upper face 66. The upper face 66 has an upwardly protruding, ring shaped, circumferentially continuous ridge portion 67 that extends an arc of 360 degrees along the periphery of the outer bottom wall. The ridge portion 67 has a flat top surface 67A parallel to upper face 66. The bottom wall 3 is also provided a downwardly protruding ring shaped circumferentially continuous ridge portion 69 that extends through an arc of 360° with a flat bottom surface 69A that elevated the lower face 65 above a heating element represented at 70. Ridge portion 69 is spaced in a short distance from the periphery of the outer bottom wall 63. This ridge portion is an optional feature as the bottom surface could be flat. The outer container 60 also has a handle 68 rigidly attached to an upper portion of outer sidewall 64 and extends substantially parallel but at a slight upward angle to the outer bottom wall 63 away from outer container 60. The lid 62 is shown as having a handle 69 for gripping for easy removal and replacement of the cover 62 from the inner container.

The inner container 61 shown is also generally pan shaped and similar shape and size to outer container 60 having a flat inner bottom wall 73 and an inner sidewall 74 extending upwardly and outwardly from the periphery of inner bottom wall 73. Inner container bottom 73 has a lower face 75 and an upper face 76. The lower face 75 has a downwardly protruding, circumferentially continuous ring shaped ridge portion 77 that extends through an arc of 360 degrees along the periphery of the inner bottom wall 73. Ridge portion 77 corresponds in shape and size to outer container bottom ridge portion 67 and is spaced in a short distance from the periphery of inner bottom wall 73. The ridge portion 77 has a flat bottom surface 77A. Inner bottom wall 73 has a plurality of spaced smoke flow apertures 79 extending between lower face 75 and upper face 76, inside of ridge portion 77. The inner container 61 also includes a handle 78, rigidly attached to an upper portion of inner container sidewall 74 and extending parallel to the inner container bottom 73 away from inner container 61. The cover 62 is placed over an upper edge of inner sidewall 74 to close the top of inner container 61.

Figure 5:
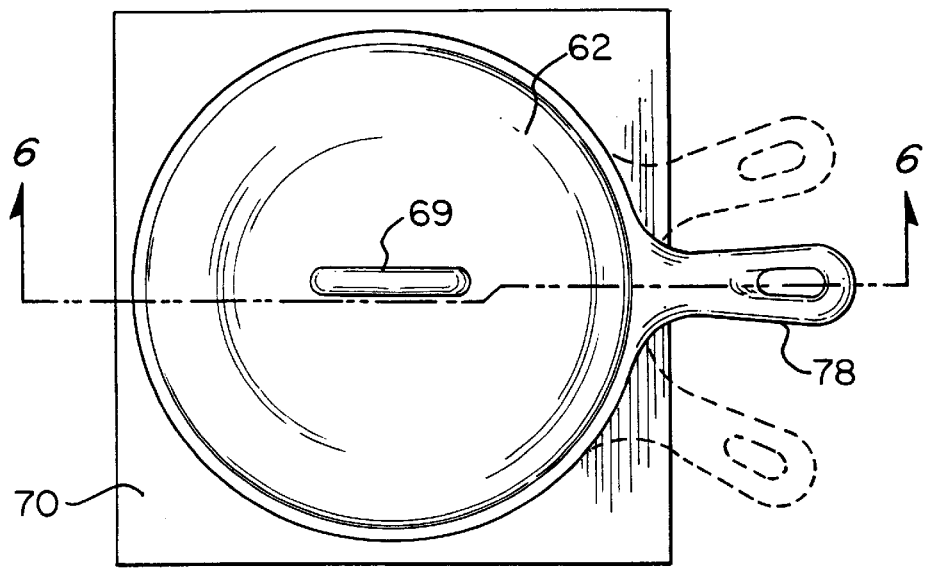
FIG. 5 is a top plan view of the apparatus shown in FIG. 4 with rotated positions for the outer container shown in dashed lines.
Figure 6:
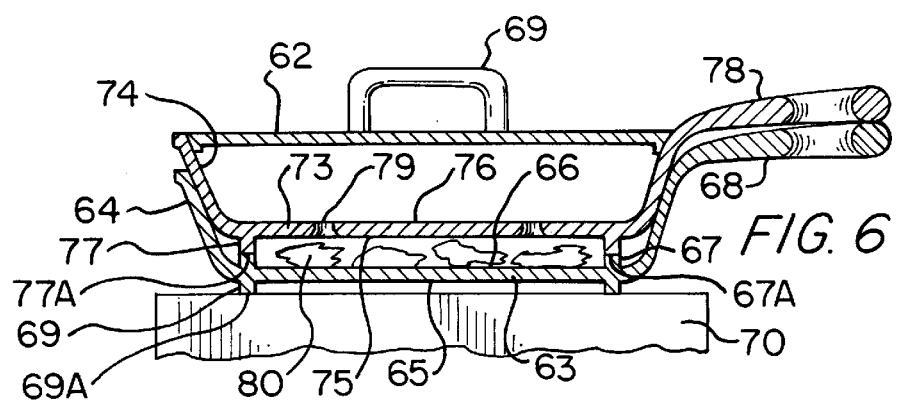
FIG. 6 is a sectional view taken along liens 6—6 of FIG. 5.
Figure 7:
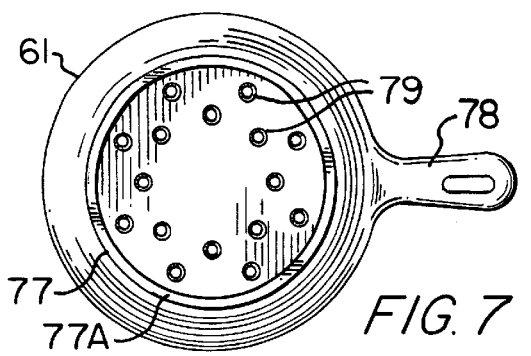
FIG. 7 is a bottom plan view of the inner container.
Figure 8:
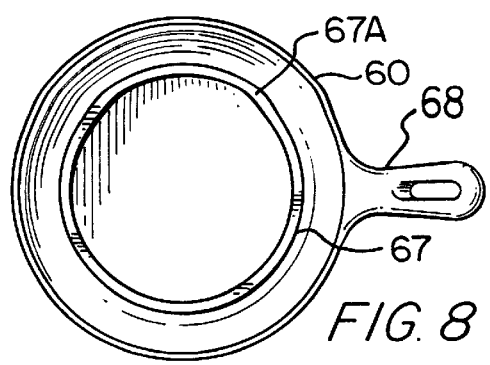
FIG. 8 is a top plan view of the outer container.

As shown in dashed lines in FIG. 5, the inner container 61 will rotate to different angular positions throughout a range of 360° on the outer container 60 using contacting surfaces 67A and 77A as bearing surfaces.

Figure 9:
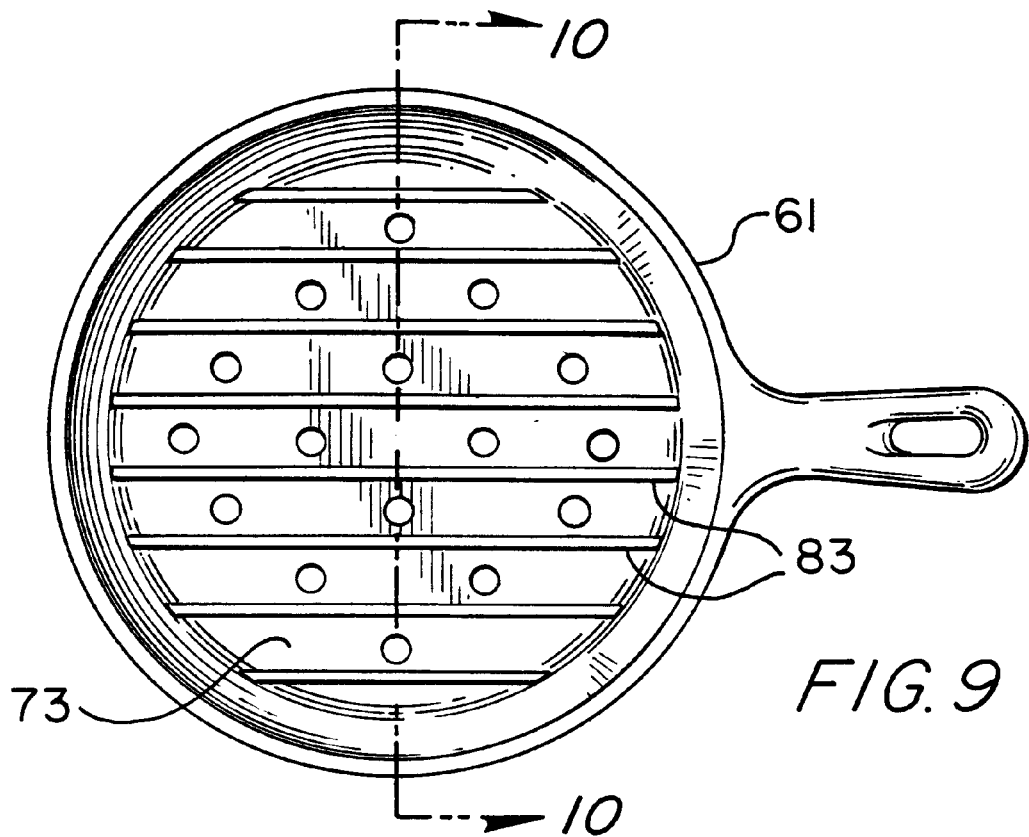
FIG. 9 is a top plan view of a modified inner container.
Figure 10:
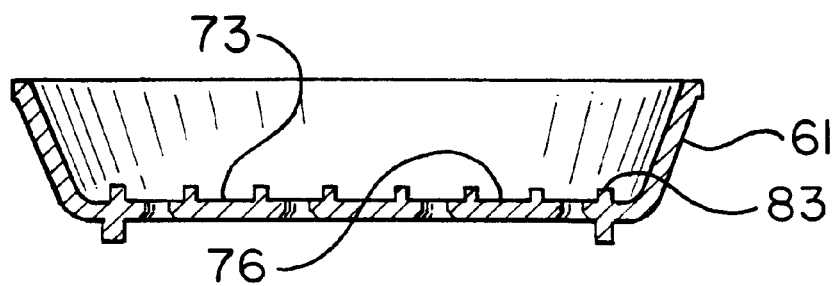
FIG. 10 is a sectional view taken along lines 10—10 of FIG. 9.

Referring now to FIGS. 9 and 10 there is shown a modification of the inner container top face 76 where on the inner bottom wall 73 there is formed a plurality of upwardly protruding, parallel spaced ribs 83 preferably of the same material as the inner bottom wall 73 and are an integral part thereof that serve as a grill for the food and will provide a lined or grilled appearance in the food being smoked. An option would be to use a grill insert made of a lattice of intermittent rods that fits inside the inner container.

In use a smoke material 80, such as wood chips, fresh herbs, cooking chips or the like, is placed in outer container 60 inside of ridge portion 67 in the space between the bottom walls 63 and 73. Inner container 61 is placed over outer container 60 and nests therein. Inner bottom ridge surface 77 rests on and is in contact with outer surface 67 to support inner container 61 and to space inner container 61 above outer container 60. The cover 62 covers the top opening of the inner container. Food is placed in the inner container 61.

Heat is applied to the outer container that conducts and radiates to the inner container. Smoke passes through openings to smoke the food.

In a preferred high temperature method the heat is applied to both containers 60 and 61 and the cover 62. A smoke material 80 is placed in the outer container 60 and the top of the inner container is covered. The inner container 61 is placed in the outer container and heat is applied to the outer container so that smoke passes from the outer container through the smoke flow apertures 79 and to the food and heat is conducted and radiated from the outer container to the inner container to smoke and cook the food. The higher temperature range is preferably between about 300° F. to 1000° F. for a time of about one to five minutes.

In a preferred low temperature slow cooking and smoking method the outer container 60 is heated, smoke material 80 is placed in the outer container 60, the heat is removed from the outer container 60, the food is placed in the inner container, the cover 62 is placed on the outer container 60 and the outer container is then heated so as to conduct and radiate heat into the inner container to smoke and cook the food. The low temperature range preferably is between about 1° F. to 300° F. for a time of about five minutes to sixty minutes.

Although the present invention has been described with a certain degree of particularity, it is understood that the present disclosure has been made by way of example and that changes in details of structure may be made without departing from the spirit thereof.

What is claimed is:

1. Apparatus for cooking and smoking food comprising:
   an outer container having a closed outer bottom wall and an open top,
   an inner container having an open top and an inner bottom wall with a plurality of spaced smoke-flow apertures, said inner container nesting in and having surfaces in contact with surfaces of said outer container for conducting and radiating heat from said outer container to said inner container,
   said outer container having a smoke material therein that when heated produces smoke which passes from said outer cooking container through said smoke-flow apertures to smoke a food disposed in said inner container with heat applied to said outer container being conducted via said outer container to said inner container during cooking and smoking,
   said inner bottom wall being spaced above said outer bottom wall, and
   cover means for said inner container open top,
   said inner bottom wall and said outer bottom wall being of similar shape and size,
   said outer container having an outer sidewall that extends upwardly and outwardly from said outer container bottom,
   said inner container having an inner sidewall that extends upwardly and outwardly from said inner bottom wall, said upwardly and outwardly extending outer sidewalls facilitating nesting said inner container into said outer container,
   at least one of said outer bottom wall and said inner bottom wall having a protruding ridge portion to space said inner bottom wall above said outer bottom wall.

2. The apparatus as set forth in claim 1 wherein said upwardly protruding ridge portion has a flat top surface and said downwardly protruding portion has a flat bottom face in contact with said flat top surface, said top face and bottom faces acting as bearing surfaces for rotation of said inner container at an angle relative to said outer container about the center of said outer container.

3. The apparatus as set forth in claim 1 wherein said ridge portions extend through an arc of 360° and are circumferentially continuous.

4. The apparatus as set forth in claim 1 wherein said outer container has a downwardly protruding ring shaped ridge portion extending down from said outer bottom wall to elevate a lower surface of said outer bottom wall from a support surface.

5. The apparatus as set forth in claim 1 wherein said inner container has a plurality of spaced elongated ribs projecting up from a top surface of said bottom wall to form a grill for food supported thereon.

6. The apparatus as set forth in claim 1 wherein said container is made of cast iron.

7. The apparatus as set forth in claim 1 wherein said container is made of aluminum.

8. The apparatus as set forth in claim 1 wherein each of said inner and outer containers is generally pan shaped and each has a handle.

9. An inner container for use in combination with an outer container having a closed bottom wall and an open top for smoking and cooking food, said inner container having an open top that is covered by a cover during use and an inner bottom wall with a plurality of spaced smoke-flow apertures, said inner container being adapted for nesting in and having surfaces in contact with surfaces of said outer container so that a smoke material in said outer container when heated produces smoke which passes from said outer cooking container through said smoke-flow apertures to smoke a food disposed in said inner container with heat applied to said outer container being conducted via said outer container to said inner container and radiated from said outer container to said inner container during cooking and smoking, said inner bottom wall and said outer bottom wall being of similar shape and size, said outer container having an outer sidewall that extends upwardly and outwardly from said outer container bottom, said inner container having an inner sidewall that extends upwardly and outwardly from said inner bottom wall, said upwardly and outwardly extending outer sidewalls facilitating nesting said inner container into said outer container, at least one of said outer bottom wall and said inner bottom wall having a protruding ridge portion to space said inner bottom wall above said outer bottom wall.

10. The container as set forth in claim 9 said container having a plurality of spaced elongated ribs projecting up from a top surface of said bottom wall to form a grill for food supported thereon.

11. The container as set forth in claim 9 being generally pan shaped having a sidewall that extends up and out from said bottom wall and a handle attached to an upper portion of said sidewall and extending laterally away from said sidewall.

12. A method of cooking and smoking food comprising:

heating at least an outer container having a closed bottom and an open top to a preselected temperature, placing smoke material in said outer container to cause said material to smoke, placing food in an inner container having an open top and an inner bottom wall and a plurality of spaced smoke-flow apertures and a cover over said top, placing said inner container in said outer container with said inner container having surfaces in contact with surfaces of said outer container for conducting heat from and radiating heat from said outer container to said inner container to cook said food, said inner bottom wall and said outer bottom wall being of similar shape and size, said outer container having an outer sidewall that extends upwardly and outwardly from said outer container bottom, said inner container having an inner sidewall that extends upwardly and outwardly from said inner bottom wall, said upwardly and outwardly extending outer sidewalls facilitating nesting said inner container into said outer container, at least one of said outer bottom wall and said inner bottom wall having a protruding ridge portion to space said inner bottom wall above said outer bottom wall, and heating said outer container to conduct and radiate heat to said inner container to cook and smoke said food.

13. A method of cooking and smoking food comprising the steps of:

heating an outer container having a closed outer bottom wall and an open top, an inner container having an open top and an inner bottom wall with a plurality of spaced smoke-flow apertures and a cover for said inner container open top to a preselected temperature, placing a smoke material in said outer container to cause said material to smoke, placing food in said inner container and covering said top of said inner container with said cover, placing said inner container in said outer container with said inner container having surfaces in contact with surfaces of said outer container for conducting heat from and radiating heat from said outer container to said inner container to cook said food, said inner bottom wall and said outer bottom wall being of similar shape and size, said outer container having an outer sidewall that extends upwardly and outwardly from said outer container bottom, said inner container having an inner sidewall that extends upwardly and outwardly from said inner bottom wall, said upwardly and outwardly extending outer sidewalls facilitating nesting said inner container into said outer container, at least one of said outer bottom wall and said inner bottom wall having a protruding ridge portion to space said inner bottom wall above said outer bottom wall, and heating said outer container to cause said material to produce smoke which passes from said outer cooking container through said smoke-flow apertures to smoke said food during said cooking.

14. The method as set forth in claim 13 wherein said heating is at high temperatures between about 300° F. to 1000° F. for a time of about 1 minute to five minutes.

15. A method of cooking and smoking food comprising the steps of:

heating an outer container having a closed bottom and an open top to a preselected temperature, placing smoke material in said outer container to cause said material to smoke, removing heat from said outer container, placing food in an inner container having an open top and an inner bottom wall and a plurality of spaced smoke-flow apertures and a cover over said top, said inner bottom wall and said outer bottom wall being of similar shape and size, said outer container having an outer sidewall that extends upwardly and outwardly from said outer container bottom, said inner container having an inner sidewall that extends upwardly and outwardly from said inner bottom wall, said upwardly and outwardly extending outer sidewalls facilitating nesting said inner container into said outer container, at least one of said outer bottom wall and said inner bottom wall having a protruding ridge portion to space said inner bottom wall above said outer bottom wall, and heating said outer container to conduct and radiate heat from said outer container to said inner container to cook and smoke said food.

16. The method as set forth in claim 15 wherein said heating is at low temperatures between about 1° F. to 300° F. for a time of about 5 minutes to 60 minutes.

* * * * *